United States Patent

[11] 3,577,600

[72] Inventor John S. Graham
       Clemson, S.C.
[21] Appl. No. 762,951
[22] Filed Sept. 26, 1968
[45] Patented May 4, 1971
[73] Assignee The United States of America as represented by the Secretary of Agriculture

[54] APPARATUS FOR RAPID AUTOMATED MEASUREMENT OF DRAFTING FORCE AND DRAFTING FORCE VARIABILITY
1 Claim, 1 Drawing Fig.
[52] U.S. Cl.......................................................... 19/293
[51] Int. Cl........................................................ D01h 5/18
[50] Field of Search............................................ 19/239, 293, 270, 240

[56] References Cited
FOREIGN PATENTS
1,324,756 3/1963 France .......................... 19/239

Primary Examiner—Dorsey Newton
Attorneys—R. Hoffman and W. Bier

ABSTRACT: An apparatus for measuring the drafting force and drafting force variability in conventional drafting systems. The force sensing assembly together with the drafting rolls and the associated roll driving mechanism of the apparatus are oscillatingly supported on a resilient directionally restricted pivot, so that drafting force is transformed into bending movement which movement causes angular displacement of the assembly around the resilient pivot as a center. Force measurement is accomplished via an electronic strain gauge. The electrical signals generated by the strain gauge are employed as analogs of drafting force and drafting force variability and accordingly analyzed automatically or semiautomatically.

PATENTED MAY 4 1971
3,577,600
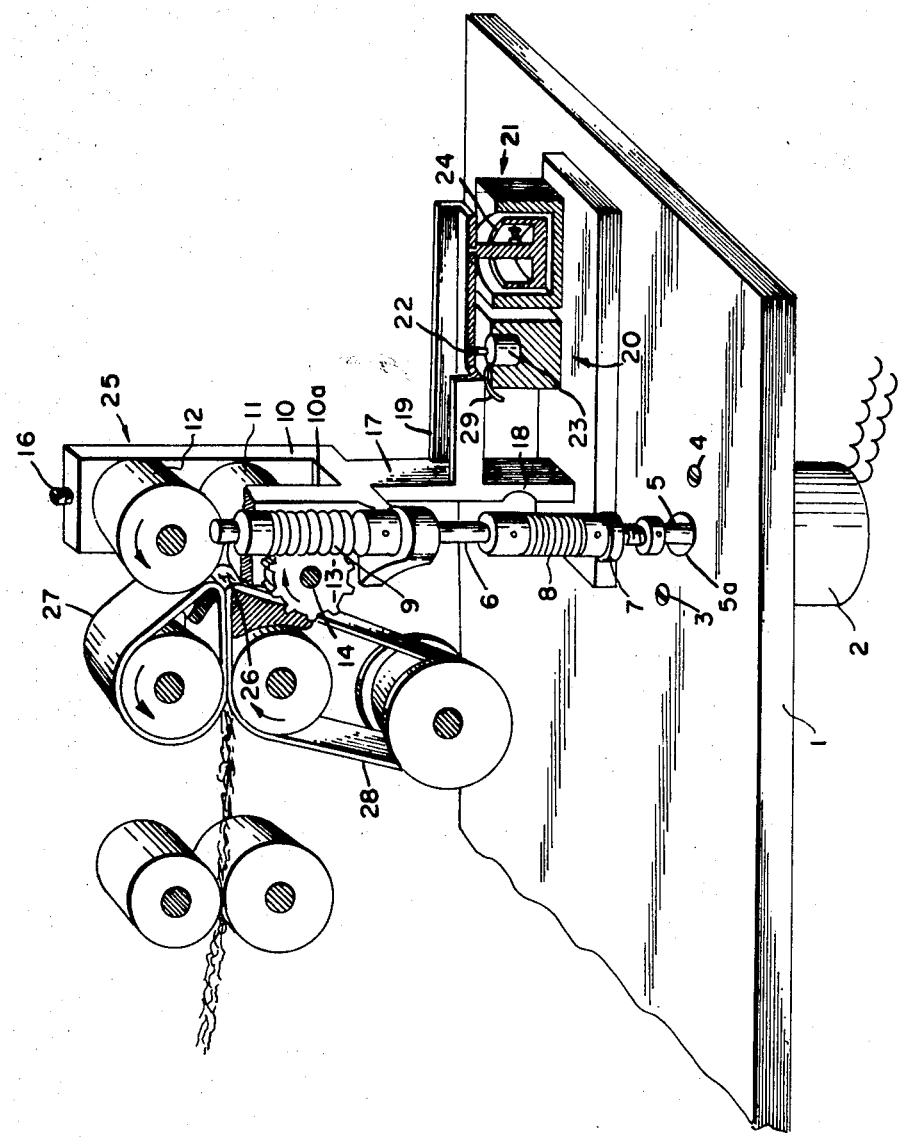
INVENTOR
JOHN S. GRAHAM
BY R. Hoffman
ATTORNEY

APPARATUS FOR RAPID AUTOMATED MEASUREMENT OF DRAFTING FORCE AND DRAFTING FORCE VARIABILITY

A nonexclusive, irrevocable, royalty-free license in the invention herein described, throughout the world for all purposes of the United States Government, with the power to grant sublicenses for such purposes, is hereby granted to the Government of the United States of America.

The object of this invention is to provide an improved apparatus for measuring drafting force and drafting force variability in conventional drafting systems, and to provide a drive system for a light drafting-force measuring assembly capable of measuring drafting-force waves at normal drafting speeds.

Another object of the invention is to apply a conventional long-draft drafting system to a drafting force tester.

A further object of the invention is to incorporate a vacuum stripping system to a drafting force tester to collect and store the fiber during the drafting cohesion test operation.

Still another object of the invention is to provide the force-sensing assembly of a drafting-force tester with a light worm gear drive.

The power to drive the drafting rolls in the swinging force-sensing assembly is supplied by a rigidly mounted motor, coupled to a worm drive shaft by means of a uniformly flexible coupling which coupling is aligned with the supporting spring-hinge the measuring assembly so that the flexible coupling acts as part of a spring suspension which produces a bending resistance proportional to the angular displacement. Force measurements are accomplished through an electronic strain-gauge system in conjunction with automatic or semiautomatic analysis of electrical analogs of drafting force and drafting force variability.

The sole FIGURE of drawing is a side elevation, partly in section, showing the mechanisms and parts of the spinning-draft tester. The measuring elements are contained in the force-sensing, front-drafting assembly, but to complete the representation, a schematic of the back and middle roll sections of a conventional spinning-draft system is shown.

In order that the invention may be better understood, reference is made to the following description and to the accompanying drawing. Thus, as seen from the drawing base 1 is a rigid, flat, regular-shaped, horizontally positioned plate adapted to position and secure the apparatus. High-speed electric motor 2 is attached rigidly to the under side of the base with machine screws 3 and 4. Motor shaft 5 which passes with clearance through opening 5a in the base is coupled to the lower end of apparatus drive shaft 6 through a torque sensitive escapement clutch 7 and flexible bellows coupling 8. The flexible bellows coupling permits lateral movement of the apparatus drive shaft above the flexible bellows coupling. The upper end of the apparatus drive shaft terminates in worm gear 9 which worm gear is rotatably mounted on one side member 10a of a rigid upright rectangular-shaped open faced frame, indicated generally as 25, which frame defines a mounting means for paired drafting rolls 11 and 12. The drafting rolls are a pair of hard, smooth-surfaced rolls journaled into the frame at each axial end, mounted in vertical stacked array with adjacent roll surfaces in tangential contact.

Worm gear 9 of the apparatus drive shaft 6 coacts with toothed gear 13 which is integral with one outboard end of the lower drafting roll shaft 14 to rotate the lower drafting roll 11.

The upper roll 12 of the drafting roll pair is driven by means of roll surface contact with the lower roll.

Adjusting screw 16 on side member 10 and a counterpart element on side member 10a (not shown for reasons of drawing clarity) are used as roll loading means to load the shaft ends of the upper roll and urge the upper roll surface into tangential contact with the lower roll surface. A loading of 12 pounds per linear inch of roll length is the preferred loading. The open faced rectangular frame 25 which constitutes the mounting means for the paired drafting rolls and the associated worm gear drive is carried on the upper end of rigid elongated vertical supporting member 17. The lower end of the supporting member is securely attached to the base. The vertical support member incorporates an attenuated spring section 18 resilient in the drafting direction and located adjacent the base, juxtapositioned relative the flexible bellows coupling 8 of the apparatus drive shaft 6. The attenuated section is adapted to be resiliently responsive to drafting force thereby to permit oscillation as a unit, of the drafting rolls and the supporting frame for the drafting rolls, in a direction parallel the drafting direction, the attenuated section being the center of oscillation.

Rigid, horizontal member 19 is attached to vertical support member 17 at a location above the attenuated section and is extended in the drafting direction. The horizontal member has transducer assembly 20 and a hydraulic dash pot assembly 21 incorporated toward the outboard end.

The transducer assembly 20 is adapted to transform drafting force as reflected by oscillatory motion of that portion of the apparatus above the attenuated section into electrical signals. The dash pot assembly is adapted to dampen and moderate the oscillatory movement.

The paired drafting rolls withdraw fibers 26 from the nip of the feed aprons 27 and 28 creating a force which moves the paired drafting rolls in a direction opposite the direction of drafting, thereby bending the thin attenuated section 18. The radial and longitudinal alignment between the attenuated section 18 and the bellows coupling 8 is such that these two flexible elements act as a single hinge-spring providing both a pivot point and a restoring force against deflection of that portion of the apparatus above the attenuated section and the flexible bellows coupling. Movement of that portion of the apparatus above the attenuated section and the flexible bellows coupling, which portion includes the horizontal member 19, displaces iron core 22 in the transformer transducer 23 to produce an electrical signal which signal is transmitted through cable 29 to an analyzer and is used as the analog of the drafting force causing the movement. The piston 24 on the outboard end of the horizontal member 19 is submerged in light machine oil held in dash pot 21. The cotton emerging from between drafting rolls 11 and 12 can be recovered by conventional vacuum means. Thus, one vacuum stripping orifice (not shown) can be positioned vertically above roll 12 and a second orifice (also not shown) can be positioned vertically beneath roll 11. These orifices, as is conventional in the art, are connected by means of hoses (not shown) which deliver the removed cotton to any suitable container.

The electrical signal from the transducer is amplified, and separate measurements of mean drafting force, mean drafting-force amplitude, number of points of low drafting force, etc., are made by automatic electrical signal analysis or by calculations made from data taken from autographic or other type recordings of the drafting force analog. An automatic point-to-point integrating system, not part of this invention has been successfully used for separately measuring drafting force and drafting-force variability using the electronic integrating system described in Textiles Industries, Vol. 130, pp. 140 (1966); and Textile Industries, Oct. 1967, pp. 171. Such systems are known to the art and are made from commercially available components.

The above-described drafting-force tester has been used successfully to simultaneously measure mean drafting force and mean drafting-force wave amplitude in drafting normal-sized single rovings, multiple rovings, and multiply card slivers at front drafting roll speeds above 200 r.p.m., using automatic integrators to sum separately the analogs of mean drafting force and drafting-force wave amplitude. Having thus described my invention,

I claim:
1. An apparatus for measuring the drafting forces in a fiber drafting system comprising:
   a base, a pair of drafting rolls, a vertical upright member secured to said base and including roll mounting means adapted to rotatably position said drafting rolls in vertical stacked array, said vertical upright member incorporating adjacent the said base an attenuated spring section resilient in the drafting direction, drafting force sensing means including transducer means and motion damping means, apparatus drive shaft including a flexible shaft coupling resilient in the drafting direction, a torque sensitive escapement clutch means and a worm gear and gear wheel combination adapted to rotate the drafting rolls, drive means adapted to turn said apparatus drive shaft with uniform rotary motion;

said base comprising a rigid, flat, regularly shaped, horizontally disposed plate adapted to secure the apparatus in a fixed position;

said drafting rolls comprising two hard, smooth surfaced rolls journaled at each end, mounted axially parallel in vertical stacked array with roll surfaces in tangential contact, said drafting rolls together defining an upper drafting roll and a lower drafting roll; a toothed gear wheel integral one outboard journal end of said lower drafting roll and adapted in combination with a worm gear to rotate said lower roll, said upper roll rotated counter directionally via roll surface contact;

said vertical upright member incorporating at the upper unsecured end distal the base, said drafting roll mounting means which comprise a rigid, upright, rectangular shaped, open-faced frame including bearing means integral the frame side members, said bearing means adapted to coact with the drafting roll journals thereby to position and to rotatably support said drafting rolls, journal loading means adapted to bias the adjacent roll surfaces together thereby to accomplish counterrotation of the said drafting rolls;

said vertical upright member incorporating said attenuated spring section adjacent the base plate and adapted to permit the resilient oscillatory motion of all the apparatus components located thereabove, the oscillatory motion restricted to that direction normal the axes of the said drafting rolls and opposite the direction of drafting;

said drafting force sensing means comprising a rigid horizontal member extended in the direction of drafting with one end attached to the said vertical upright member at a location above the attenuated spring section, said transducer means integral the said horizontal member at a location outboard the point of attachment to the said vertical upright member and adapted to transform drafting forces as reflected by oscillatory motion of the horizontal member into electrical signals, said motion damping means comprising an hydraulic dashpot integral the said horizontal member located outboard the said transducer means and adapted to moderate oscillatory motion of the apparatus;

said apparatus drive shaft comprising an elongated rotary member disposed vertically alongside the said vertical upright member, located normal thereto relative the direction of drafting, said apparatus drive shaft including at the upper end said worm gear and gear wheel combination, the combination adapted to rotate the lower drafting roll, said flexible shaft coupling juxtapositional the said attenuated spring section and adapted to be cooperatively resilient relative the said attenuated spring section, and said torque sensitive escapement clutch;

said drive means comprising a high speed electric motor coupled to the lower end of said apparatus drive shaft immediately below the said torque sensitive escapement clutch, said drive means adapted to drive the said drafting rolls through the said apparatus drive shaft at normal drafting speeds.